(12) United States Patent
Neitzel et al.

(10) Patent No.: US 8,977,851 B2
(45) Date of Patent: Mar. 10, 2015

(54) REMOVABLE SECURITY MODULES AND RELATED METHODS

(75) Inventors: Lee Allen Neitzel, Austin, TX (US);
Gary Keith Law, Georgetown, TX (US);
Godfrey R. Sherriff, Austin, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 1096 days.

(21) Appl. No.: 12/356,863

(22) Filed: Jan. 21, 2009

(65) Prior Publication Data
US 2010/0185857 A1 Jul. 22, 2010

(51) Int. Cl.
G05B 19/042 (2006.01)
G06F 12/14 (2006.01)

(52) U.S. Cl.
CPC ........ G05B 19/0428 (2013.01); *G06F 12/1408* (2013.01); *G05B 2219/25107* (2013.01); *G05B 2219/25326* (2013.01)
USPC .............................. 713/168; 700/83; 709/204

(58) Field of Classification Search
CPC ............ G05B 19/0428; G05B 19/048; G05B 2219/25107; G05B 2219/25326; G06F 12/1408–12/1491; G06F 21/55–21/577; G06F 2212/1052
USPC .............. 713/150, 168–181, 189–194; 726/2; 700/83; 709/204–207
See application file for complete search history.

(56) References Cited

U.S. PATENT DOCUMENTS

| | | |
|---|---|---|
| 4,982,371 A | 1/1991 | Bolan et al. |
| 5,158,464 A | 10/1992 | Landrini |
| 5,422,634 A | 6/1995 | Okubo |
| 5,432,711 A | 7/1995 | Jackson et al. |
| 5,828,851 A | 10/1998 | Nixon et al. |
| 5,844,601 A | 12/1998 | McPheely et al. |
| 5,970,430 A | 10/1999 | Burns et al. |
| 5,991,530 A | 11/1999 | Okada et al. |
| 6,055,633 A | 4/2000 | Schrier et al. |

(Continued)

FOREIGN PATENT DOCUMENTS

| | | |
|---|---|---|
| DE | 102006058330 | 6/2008 |
| EP | 1414215 | 4/2004 |

(Continued)

OTHER PUBLICATIONS

Extended Search Report, issued by the European Patent Office in connection with European Application No. 10151052.7-1239, on Feb. 4, 2011, 7 pages.

(Continued)

*Primary Examiner* — Ashok Patel
*Assistant Examiner* — Kevin Bechtel
(74) *Attorney, Agent, or Firm* — Hanley, Flight & Zimmerman, LLC

(57) ABSTRACT

Example removable security modules for use with process control devices and related methods are disclosed. An example removable security module includes a body configured to be removably coupled to the process control device and a memory disposed in the body with a shared secret stored in the memory. The example removable security module also includes a processing unit disposed in the body, coupled to the memory and configured to read information from the process control device, compare the information to the shared secret and authenticate the process control device based on the comparison.

30 Claims, 7 Drawing Sheets

(56) References Cited

U.S. PATENT DOCUMENTS

| | | | |
|---|---|---|---|
| 6,098,891 | A | 8/2000 | Guthery et al. |
| 6,192,281 | B1 | 2/2001 | Brown et al. |
| 6,255,988 | B1 | 7/2001 | Bischoff |
| 6,266,726 | B1 | 7/2001 | Nixon et al. |
| 6,374,315 | B1 | 4/2002 | Okada et al. |
| 6,453,687 | B2 | 9/2002 | Sharood et al. |
| 6,567,915 | B1 | 5/2003 | Guthery |
| 6,934,862 | B2 | 8/2005 | Sharood et al. |
| 7,246,194 | B2 | 7/2007 | Train et al. |
| 7,309,260 | B2 | 12/2007 | Brower et al. |
| 2003/0014536 | A1 | 1/2003 | Christensen et al. |
| 2003/0145221 | A1 | 7/2003 | Atzmueller et al. |
| 2004/0064699 | A1* | 4/2004 | Hooker et al. ............ 713/170 |
| 2004/0111238 | A1 | 6/2004 | Kantzes et al. |
| 2004/0260405 | A1 | 12/2004 | Eddie et al. |
| 2005/0222794 | A1 | 10/2005 | Baird et al. |
| 2005/0267641 | A1 | 12/2005 | Nickerson et al. |
| 2006/0026672 | A1 | 2/2006 | Braun |
| 2006/0160487 | A1 | 7/2006 | Nam et al. |
| 2007/0143073 | A1 | 6/2007 | Richardson |
| 2007/0244819 | A1 | 10/2007 | Goeke et al. |
| 2007/0261103 | A1* | 11/2007 | Viavant et al. ................ 726/2 |
| 2008/0004726 | A1 | 1/2008 | Gehring et al. |
| 2008/0027587 | A1* | 1/2008 | Nickerson et al. ......... 700/284 |
| 2008/0058964 | A1 | 3/2008 | Nickerson et al. |
| 2008/0071973 | A1 | 3/2008 | Chow et al. |
| 2008/0163376 | A1 | 7/2008 | Naccache |
| 2008/0233920 | A1 | 9/2008 | Laitinen |
| 2008/0276087 | A1 | 11/2008 | Hasegawa |
| 2009/0125966 | A1 | 5/2009 | Cho et al. |
| 2009/0254626 | A1* | 10/2009 | Ahtisaari ................... 709/206 |

FOREIGN PATENT DOCUMENTS

| | | |
|---|---|---|
| EP | 1414216 | 4/2004 |
| EP | 1621944 | 2/2006 |
| EP | 2211244 | 7/2010 |
| GB | 2368701 | 5/2002 |
| JP | S64-73485 | 3/1989 |
| JP | H08-221482 | 8/1996 |
| JP | H09-114946 | 5/1997 |
| JP | 2002/245422 | 8/2002 |
| JP | 2002/278608 | 9/2002 |
| JP | 2003-022408 | 1/2003 |
| JP | 2004-054951 | 2/2004 |
| JP | 2007-013439 | 1/2007 |
| WO | 0123971 | 4/2001 |
| WO | 03013104 | 2/2003 |
| WO | 2007128544 | 11/2007 |
| WO | 2008018762 | 2/2008 |

OTHER PUBLICATIONS

UK Intellectual Property Office, "UK Search Report," dated Dec. 6, 2007, in connection with British Application No. GB0718038.3 (3 Pages).

United States Patent and Trademark Office, "PCT International Search Report," dated Dec. 20, 2008, in connection with International Application No. PCT/US02/21698 (2 Pages).

James O. Gray Jr., "Integration Foundation Fieldbus into a Distribution Control System," Foundation Fieldbus in the real world, Seminar Amsterdam, Nov. 30, 2000, (35 Pages).

"UK Search Report," issued by UK Intellectual Property Office on May 27, 2010, in connection with UK Application No. GB1000953.8, 4 pages.

State Intellectual Property Office of P.R. China, "The Notification of the Third Office Action," issued in connection with corresponding Chinese Patent Application No. 200910215252.5, mailed Jul. 28, 2014 (9 pages).

UK Examination Report, issued by UK Intellectual Property Office on Dec. 5, 2013, in connection with UK Application No. GB1000953.8, (2 pages).

State Intellectual Property Office of P.R. China, "The Notification of the Second Office Action including DeQi's English Translation of the Substantial Part of the Second Office Action Text," issued in connection with corresponding Application No. 200910215252.5, issued Feb. 24, 2014 (14 pages).

Intellectual Property Office of Great Britain, "Combined Search and Examination Report," issued in connection with corresponding Application No. GB1401630.7, issued Feb. 20, 2014 (5 pages).

Japan Patent Office, "Notice of Reasons for Rejection," issued in connection with corresponding Application No. 2010-010972, issued Jan. 7, 2014 (7 pages).

"The Notification of the First Office Action," issued by the State Intellectual Property Office of P.R. China, in connection with Chinese patent application No. 200910215252.5, on Jul. 16, 2013, 13 pages.

"UK Examination Report," issued by UK Intellectual Property Office on May 21, 2013, in connection with UK Application No. GB1000953.8, 4 pages.

UK Combined Search and Examination Report, issued by UK Intellectual Property Office on Oct. 10, 2013, in connection with UK Application No. GB1316805.9, 3 pages.

* cited by examiner

REMOVABLE SECURITY MODULES AND RELATED METHODS

FIELD OF THE DISCLOSURE

The present disclosure relates generally to process control systems and, more particularly, to removable security modules for use with process control devices.

BACKGROUND

Process control systems, like those used in chemical, petroleum, pharmaceutical, pulp and paper, or other manufacturing processes, typically include one or more process control devices such as controllers and input/output (I/O) servers that are communicatively coupled to at least one host including at least one operator workstation and to one or more field devices (e.g., device controllers, valves, valve actuators, valve positioners, switches, transmitters, temperature sensors, pressure sensors, flow rate sensors and chemical composition sensors or combinations thereof) to control physical processes or discrete manufacturing operations (e.g., opening or closing valves and measuring or inferring process parameters) in a physical plant such as oil refineries and automobile manufacturing facilities. A process control device receives signals indicative of process measurements made by the field devices and/or other information pertaining to the field devices, uses this information to implement a control routine, and generates control signals that are sent over the buses or other communication lines to the field devices to control the operation of the process control system.

Many process control systems incorporate security features to prevent unauthorized persons from changing control parameters, commanding devices, obtaining process control information, etc. to ensure the safe, secure operation of a process plant. Such security features are can be especially important in process control plants including a safety instrumented system (SIS), which may be required to perform a safe shut down of a main or primary process control system for certain process operations involving hazardous chemicals or any other material or process that could present a safety risk in the event the main or primary process control system fails or is otherwise compromised during operation. Traditionally, process control systems provided security for safety instrumented systems by using an independent and separate safety system, the use of which was typically authorized to a limited number of personnel. However, the increased costs and effort of operating and maintaining completely separate systems have led to the integration of safety systems within process control systems. Such integration of safety systems into process control systems introduces security concerns and requires additional security measures to prevent unauthorized changes to safety instrumented systems even when the process control system itself has been compromised.

SUMMARY

Example removable security modules for use with process control devices and related methods are disclosed. An example removable security module includes a body configured to be removably coupled to the process control device and a memory disposed in the body with a shared secret stored in the memory. The example removable security module also includes a processing unit disposed in the body, coupled to the memory and configured to read information from the process control device, compare the information to the shared secret and authenticate the process control device based on the comparison.

In another example, each of a plurality of removable security modules for use with a process control device includes a body configured to be removably coupled to the process control device and a memory disposed in the body with a shared secret stored in the memory. Furthermore, each of the modules includes a processing unit disposed in the body, coupled to the memory and configured to read information from the process control device, compare the information to the shared secret and authenticate the process control device based on the comparison.

In still another example, a method of securing a process control device with a removable security module includes reading information in the process control device via the security module and comparing the information to a shared secret stored in a memory of the security module. The example method also includes authenticating the process control device based on the comparison via the security module.

Another example method of securing a process control device includes receiving a request or command at the process control device, wherein the request or command is associated with a first person. The example method also includes obtaining a secret in response to the receipt of the request or command, providing the secret to a second person, sending the secret to the process control device via the second person and authorizing the request or command for the process control device in response to the process control device receiving the secret.

In a further example, a distributed process control system includes one or more process control devices, means for reading information from at least one of process control devices and means for comparing the information to a shared secret. The example process control system also includes means for authenticating at least one of the process control devices based on the comparison and means for authorizing one or more applications for use with at least one of the process control devices.

DETAILED DESCRIPTION

Although the following describes example methods and apparatus including, among other components, software and/ or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example apparatus and systems, persons of ordinary skill in the art will readily appreciate that the examples provided are not the only way to implement such apparatus and systems.

Figure 1:
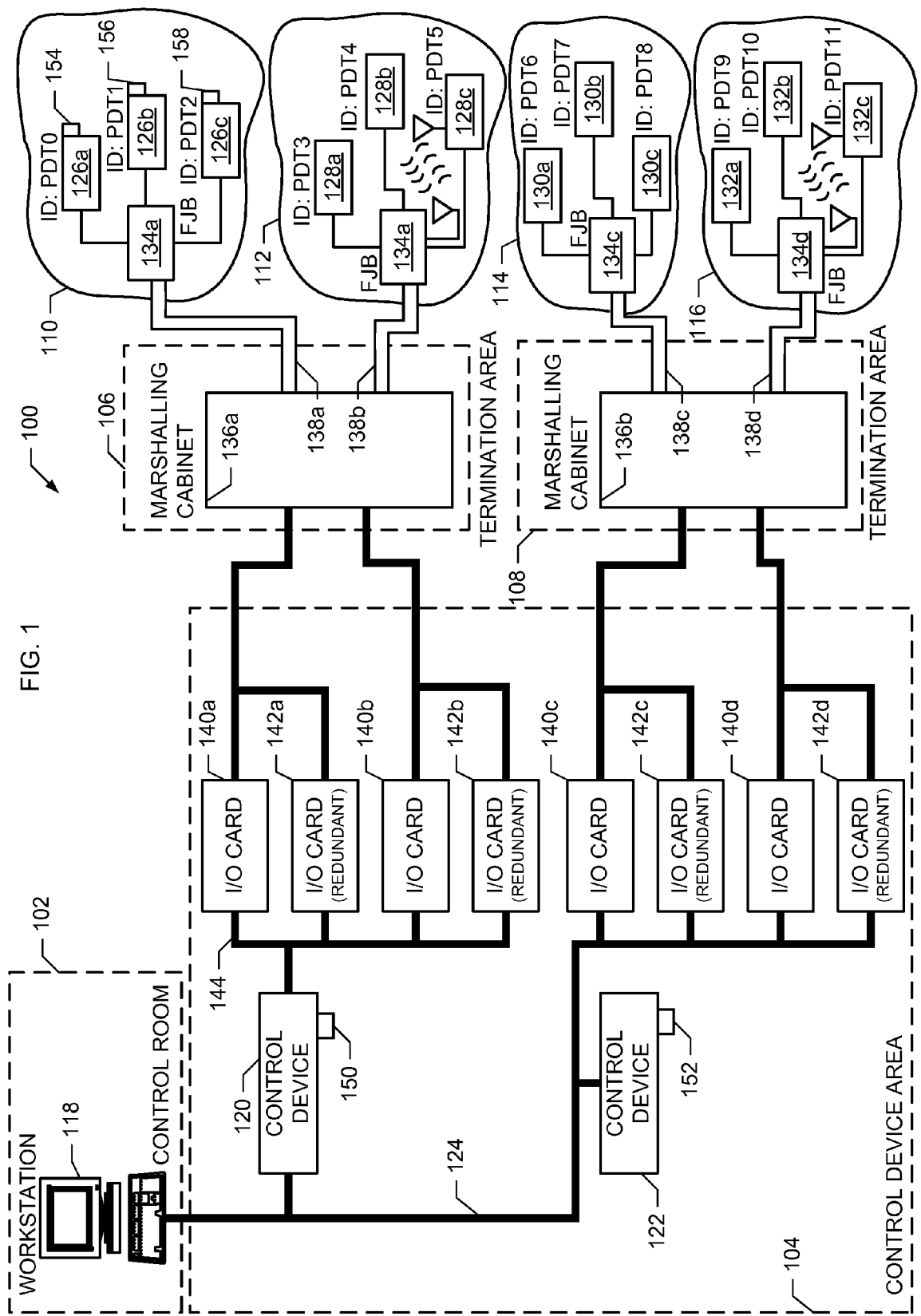
FIG. 1 is a block diagram illustrating an example process control system implementing the example methods and apparatus described herein.

An example process control system (e.g., a process system 100 of FIG. 1) includes a control room (e.g., a control room 102 of FIG. 1), a process control device area (e.g. a process control device area 104 of FIG. 1), one or more termination areas (e.g., a first termination area 106 and a second termination area 108 of FIG. 1) and one or more process areas (e.g., process areas 110, 112, 114 and 116 of FIG. 1). A process area includes a plurality of field devices that perform operations (e.g., controlling valves, controlling motors, controlling boilers, monitoring, measuring parameters, etc.) associated with performing a particular process (e.g., a chemical process, a petroleum process, a pharmaceutical process, a pulp and paper process, etc.). Some process areas are not accessible by humans due to harsh environmental conditions (e.g., relatively high temperatures, airborne toxins, unsafe radiation levels, etc.). The control room typically includes one or more workstations within an environment that is safely accessible by humans. The workstations include user applications that users (e.g., engineers, operators, etc.) can access to control operations of the process control system by, for example, changing variable values, process control functions, etc. The process controller area includes one or more control devices communicatively coupled to the workstation(s) in the control room. The control devices automate control of the field devices in the process area by executing process control strategies implemented via the workstation. An example process strategy involves measuring a pressure using a pressure sensor field device and automatically sending a command to a valve positioner to open or close a flow valve based on the pressure measurement. The termination area includes a marshalling cabinet that enables the control devices to communicate with the field devices in the process area. In particular, the marshalling cabinet marshals, organizes and/or routes signals between the field devices and one or more I/O cards communicatively coupled to the control devices.

Field devices within a process control system are communicatively coupled to control devices using a bus (e.g., a wire or wires, a cable, or a circuit) between each field device and a respective I/O card communicatively coupled to a control device (e.g., a process controller, a programmable logic controller, etc.). An I/O card enables communicatively coupling a control device to a plurality of field devices associated with different data types and/or signal types (e.g., analog input (AI) data types, analog output (AO) data types, discrete input (DI) data types, discrete output (DO) data types, digital input data types, and digital output data types)) and/or different field device communication protocols by translating or converting information communicated between the control devices and the field devices. For example, an I/O card may be provided with one or more field device interfaces configured to exchange information with a field device using the field device communication protocol associated with that field device. Different field device interfaces communicate via different channel types (e.g., analog input (AI) channel types, analog output (AO) channel types, discrete input (DI) channel types, discrete output (DO) channel types, digital input channel types, and digital output channel types)). In addition, the I/O card can convert information (e.g., voltage levels, digital values, etc.) received from the field device into process information (e.g., pressure measurement values) that the control device can use to perform operations associated with controlling the field device.

If the communications between certain control devices and field devices are not secured, unauthorized commands (e.g., commands issued in response to persons and/or control devices not authorized to issue the commands) may seriously compromise the safe operation of the process control system. For example, a particular control device may not be authorized to communicate control signals or, more generally, commands or requests to a field device to cause the field device to perform an action (e.g., to close a valve and stop the flow of a toxic and/or highly reactive chemical). To ensure that only certain control devices and/or personnel can operate such critical control devices and/or field devices, a high level of security at the control devices and the field devices is required.

While security is of paramount importance for safety instrumented systems, it has generally become of significant importance in process control systems, particularly in process control systems including integrated safety devices or equipment and which require security for the safety devices regardless of whether security for the process control system as whole has been compromised. In some known process control systems, a certain level of security is provided during the commissioning of control devices by requiring authentication and authorization of any control devices that are incorporated in the process control system. Only after a device is authenticated and authorized is it given an identity and role in the system and thereafter enabled for interoperation with the process control system.

After its commissioning, the role of a control device is enabled by providing data (e.g., downloading code or software) to the commissioned control device. During operation of the control device (i.e., when it is executing its downloaded code or software in accordance with its role), operators, engineers, or any other authorized users may be able to monitor the operation of the control device, send commands to the control device, request information from the control device, etc.

The authentication of a control device typically ensures that the control device is being used in a control system in which it was intended to operate. Some known authentication processes may use information including, for example, shared secrets that are known by the control device and the system into which the control device is being incorporated. Such a shared secret may be permanently stored on the control device at the time of manufacture, and the process control system is configured to recognize this shared secret when the control device is authenticated. In addition, the control device may permanently store information about the process control system that is used to determine if the control device is capable of interoperating with the process control system.

Once a control device has been authenticated and authorized, the control device may employ further security measures during its operation to prevent unauthorized action or use of the control device by workstations, controllers, unauthorized personnel, etc. Such further security measures often include the use of encryption for any communications between the control device and any other entities (e.g., controllers, field devices, workstations, personnel, applications, etc.) associated with the process control system. To this end, some process control devices include an encryption key or multiple encryption keys, which may be stored or otherwise manufactured into the control device at the time of its manufacture.

While the above-described security measures including shared secrets, encryption keys, etc. can be effective, the current manner in which these security measures are deployed can present some practical problems. For example, if a shared secret, which is hard-coded at the time of manufacture into some control devices, is compromised (e.g., becomes known to unauthorized entities), the shared secret in the control device would have to be changed to restore security for that device. However, to change such a shared secret may require removing the control device from the process control system and sending the control device to its manufacturer to have the shared secret changed. Further, if a control device fails and requires replacement, any device replacing the failed device would require commissioning of the replacement device (e.g., authentication, authorization, downloading of software or code to perform its role, etc.), which is time consuming and expensive and often requires the process control system to be taken off-line for an unacceptable amount of time.

Furthermore, even where the I/O cards and field devices are coupled to the correct control devices, if the control devices are used incorrectly (e.g., to perform an action in response to an erroneous command or request), there again may be serious and dangerous consequences in the process control system. To ensure that the control devices are used correctly or not improperly modified, for at least some operations, some control systems or portions of those control systems require additional access control or authorization of certain control devices to determine if those control devices are permitted to take the appropriate action in response to a request or command. In some situations (e.g., highly sensitive operations), authorization of a control device may require an operator or engineer in the control room and another person at the control device to perform authorization tasks (i.e., two-person authorization is required). Traditionally, the person at the control device would be required to turn a key or enter a code at the device based on a command from the person in the control room. However, this requires the control devices not only be manufactured with these physical constraints (e.g., having a key lock, keys, etc.) but also requires the implementation of a key management protocol to avoid loss, unauthorized duplication or a disarray of keys. The use of physical keys further requires management of key access, monitoring of key issuance and location, record keeping of personnel that actually turned keys, etc. Furthermore, key switches do not time out but, instead, need to be physically actuated by a person and, consequently in practice the keys may be perpetually locked or indefinitely enabled.

The example apparatus and methods described herein may be used to more flexibly and reliably secure a process control system. In particular, the example apparatus and methods described herein use a security module, which is removably couplable to a control device (e.g., a field device, a controller, etc.). The security module provides substantially all of security software and electronics needed to authenticate, commission and secure a control device and to authorize actions or applications associated with the control device. This includes, for example, storing secrets (e.g., a shared secret) used to authenticate the control device, storing encryption keys or other encryption information used to authorize actions of the control device, protecting against unauthorized requests or commands, providing an identity to the control device, assigning a role for the control device in the process control system, facilitating a two-person authorization scheme, and configuring the control device with data to perform the assigned role.

When a security module is coupled to a control device, the security module reads control device information from the control device. This information is compared to a shared secret stored in a memory of the security device. If there is a correlation (e.g., a match) between the control device information and the shared secret, the control device is authorized to be installed. Thus, the security module authenticates the control device and incorporates it into the process control system. If the shared secret and the control device information do not correlate or match, the control device is not authorized to use the security module and is not authorized for installation in that process control system or that portion of the process control system. In that case, the control device can not be commissioned and, thus, remains inoperable.

After the control device is commissioned, the control device is configured with the data the control device needs to perform the role assigned to it during authentication. Once the control device begins operating, the control device is normally attended by one or more operators or engineers. The operators and/or engineers interact with the control device (as well as other control devices) to control or monitor the portion of the process control system (e.g., physical plant) for which they are responsible including, for example, a paper machine, a distillation column or a manufacturing cell, to ensure that the system, or portion thereof, is operating as intended. During operation of the process control system, the control devices receive numerous requests, commands, modifications and/or other communications. To prevent the control devices from taking action in response to unauthorized communications, the security module monitors the communications and authorizes or prevents action. For example, the security module may extract information in the communications and compare at least some of the information to encryption keys stored in the memory of the security module. If there is a correlation between the encryption key and the information in the communication, the security module may authorize the control device to take the appropriate action in response to the communication. Where there is no correlation with the encryption key, action by the control device is not authorized and, thus, is prevented.

In addition, as described in greater detail below, because the example security modules described herein are removably couplable to a control device, the security features used by the control device can be changed by removing and replacing the security module with another security module that uses the desired, different security features without having to replace the control device, send the control device back to the manufacturer for reconfiguration or otherwise remove the control device from the process control system. In addition, a security module removed from a first control device may be removably coupled to a second control device (e.g., a replacement for the first control device) without having to commission the second control device. Also, as described in greater detail below, if revised (e.g., upgraded) security software and/or electronics (including, e.g., diagnostics) are available for the same type of security features used by a control device, the security module of the control device can be removed and replaced with a different security module having the revised security software and/or electronics without having to replace the control device, re-commission the control device, send the control device back to the manufacturer for reconfiguration or otherwise remove the control device from the process control system. Instead, only the security module at the control device is exchanged for a different security module that includes different security features.

The example security modules described herein may be self-contained, encapsulated electronic modules that include security software. Further, these example security modules can be removably inserted or otherwise coupled to control devices of varying types, makes (e.g., provided by different manufacturers) and models. The example security modules may be standardized and used in connection with different types of control devices to provide the security features for the control devices. More specifically, the mechanical configuration and interface, including the packaging, electrical connections (e.g., pinout), etc. of the control devices, and the security modules may be made standard so that any of a number of available security modules providing different security features can be used with any of a variety of control devices, which may be made by any number of manufacturers. Likewise, the manner in which the security modules communicate with other electronics in the control devices may also be standardized. In other words, the communication schemes used to enable communications between the control devices and the security modules may also be standardized across types, makes, models, etc. of control devices to further facilitate interchangeability of security modules with control devices.

The example security modules described herein can enable control device security to be standardized, thereby enabling the security modules to be manufactured without particularity to any one security program, i.e., set of security features. Instead, such security features can be assigned or configured by installing an appropriate security module in a control device post-manufacture of the control device (e.g., when the control device is installed in a process control system or during commissioning). This reduces the number of spare components (e.g., spare control devices) needed and facilitates easy conversion of control devices from one security program to another. The example methods and apparatus described herein also simplify the manufacture of control devices because the control devices may no longer have to include substantial amounts of internal security electronics or software. Thus, the example methods and apparatus described herein eliminate the need for manufacturers to produce as many similar control devices employing different security features.

Furthermore, the example security modules may include substantially all of the communication software and electronics for the control device. Thus, the security modules described herein may include all of the features of the communication modules described in co-pending and co-owned U.S. application Ser. No. 12/236,165, which is entitled, "Apparatus and Methods to Communicatively Couple Field Devices to Controllers in a Process Control System," and which is hereby incorporated by reference in its entirety.

Further still, system maintenance costs may be reduced because security software revisions or upgrades may be easily added by replacing a security module with another security module having the revised or upgraded software including software that incorporates new or different features. Still further, because the example security modules described herein can be easily exchanged or replaced without having to access the internal electronics of a control device, upgrades and/or alterations of a security program can be performed in situ (i.e., without having to remove the control device). Additionally, diagnostics of a control device may be included in a security module and, thus, customers desiring newer or better diagnostic software can exchange a security module for another security module containing the desired diagnostics without having to change the internal electronics of the control device. Furthermore, some example security modules may include local tagging information such as, for example, control device serial number(s) and/or other control device information. The inclusion of any or all of the security software, diagnostic information and/or local tagging information in the example security modules facilitates configuration of control devices and evaluation control device operating conditions, history, maintenance needs, etc.

In addition, in some examples, the security modules may be coded, e.g., color coded, in accordance with the type of security features, upgrades, updates, diagnostics, etc. included therein. The coding scheme facilitates identification of the proper security modules for coupling to the control device(s).

Now turning in detail to FIG. 1, an example process control system 100 includes the control room 102 with a workstation 118 communicatively coupled to one or more control devices including a first control device (e.g., a controller) 120 and a second control device (e.g., a controller) 122 via a bus or local area network (LAN) 124, which is commonly referred to as an application control network (ACN). The LAN 124 may be implemented using any desired communication medium and protocol. For example, the LAN 124 may be based on a hardwired or wireless Ethernet communication protocol. However, any other suitable wired or wireless communication medium and protocol could be used. The workstation 118 may be configured to perform operations associated with one or more information technology applications, user-interactive applications, and/or communication applications. For example, the workstation 118 may be configured to perform operations associated with process control-related applications and communication applications that enable the workstation 118 and the control devices 120 and 122 to communicate with other devices or systems using any desired communication media (e.g., wireless, hardwired, etc.) and protocols (e.g., Hypertext Transfer Protocol (HTTP), Simple Object Access Protocol (SOAP), etc.). The control devices 120 and 122 may be configured to perform one or more process control routines or functions that have been generated by a system engineer or other system operator using, for example, the workstation 118 or any other workstation and which have been downloaded to and instantiated in the control devices 120 and 122. In the illustrated example, the workstation 118 is located in the control room 102 and the control devices 120 and 122 are located in the control device area 104, which is physically separate from the control room 102.

In the example implementation of FIG. 1, the first control device 120 is communicatively coupled to I/O cards 140*a-b* and 142*a-b* via a backplane communication or internal I/O bus 144. To communicate with the workstation 118, the first control device 120 is communicatively coupled to the workstation 118 via the LAN 124. The second control device 122 is communicatively coupled to the workstation 118 and I/O cards 140*c-d* and 142*c-d* via the LAN 124. The I/O cards 140*c-d* and 142*c-d* are configured to communicate with the second control device 122 and the workstation 118 via the LAN 124. In this manner, the I/O cards 140*c-d* and 142*c-d* can exchange information directly with the workstation 118.

In the illustrated example, the example process control system 100 includes field devices 126*a-c* in the first process area 110, field devices 128*a-c* in the second process control area 112, field devices 130*a-c* in the third process control area 114 and field devices 132*a-c* in the fourth process control area 116. To communicate information between the control devices 120 and 122 and the field devices 126*a-c*, 128*a-c*, 130*a-c* and 132*a-c*, the example process control system 100 is provided with field junction boxes (FJBs) 134a-d and marshalling cabinets 136a-b. Each of the field junction boxes 134a-d routes signals from respective ones of the field devices 126a-c, 128a-c, 130a-c and 132a-c to one of the marshalling cabinets 136a-b via respective multi-conductor cables 138a-d (e.g., a multi-bus cable). The marshalling cabinets 136a-b, in turn, marshal (e.g., organize, group, etc.) information (e.g., signals) received from field devices 126a-c, 128a-c, 130a-c and 132a-c and routes the field device information to respective I/O cards (e.g., I/O cards 140a-d) of the control devices 120 and 122. In the illustrated example, the communications between the control devices 120 and 122 and the field devices 126a-c, 128a-c, 130a-c and 132a-c are bidirectional so that the marshalling cabinets 136a-b are also used to route information received from I/O cards 140a-d the control devices 120 and 122 to respective ones of the field devices 126a-c, 128a-c, 130a-c and 132a-c via the field junction boxes 134a-d.

In the example of FIG. 1, the field devices 126a-c, 128a-c, 130a-c and 132a-c are communicatively coupled to the field junction boxes 134a-d via electrically conductive (e.g., hardwired), wireless, and/or optical communication media. For example, the field junction boxes 134-a-d may be provided with one or more wired, wireless, and/or optical data transceivers to communicate with wired, wireless, and/or optical transceivers of the field devices 126a-c, 128a-c, 130a-c and 132a-c. In the illustrated example, the field junction boxes 134b and 134d are communicatively coupled wirelessly to the field devices 128c and 132c, respectively. In an alternative example implementation, the marshalling cabinets 136a-b may be omitted and signals from the field devices 126a-c, 128a-c, 130a-c and 132a-c can be routed from the field junction boxes 134a-d directly to the I/O cards 140a-d of the control devices 120 and 122 without intervening structure (i.e., without the marshalling cabinets 136a-b). In yet another example implementation, the field junction boxes 134a-d may be omitted and the field devices 126a-c, 128a-c, 130a-c and 132a-c can be directly coupled to the marshalling cabinets 136a-b.

The field devices 126a-c, 128a-c, 130a-c and 132a-c may be Fieldbus compliant valves, actuators, sensors, etc., in which case the field devices 126a-c, 128a-c, 130a-c and 132a-c communicate via a digital data bus using the well-known FOUNDATION Fieldbus communication protocol. Of course, other types of field devices and communication protocols could be used instead. For example, the field devices 126a-c, 128a-c, 130a-c and 132a-c could instead be Profibus, HART, or AS-i compliant devices that communicate via the data bus using the well-known Profibus and HART communication protocols. In some example implementations, the field devices 126a-c, 128a-c, 130a-c and 132a-c can communicate information using analog communications or discrete communications instead of digital communications. In addition, the communication protocols can be used to communicate information associated with different data types.

Each of the field devices 126a-c, 128a-c, 130a-c and 132a-c is configured to store field device identification information. The field device identification information may be a physical device tag (PDT) value, a device tag name, an electronic serial number, etc. that uniquely identifies each of the field devices 126a-c, 128a-c, 130a-c and 132a-c. In the illustrated example of FIG. 1, the field devices 126a-c, 128a-c, 130a-c and 132a-c store field device identification information in the form of physical device tag values PDT00-PDT11. The field device identification information may be stored or programmed in the field devices 126a-c, 128a-c, 130a-c and 132a-c by a field device manufacturer and/or by an operator or engineer involved in installation and/or commissioning of the field devices 126a-c, 128a-c, 130a-c and 132a-c.

To control I/O communications between the control devices 120 and 122 (and/or the workstation 118) and the field devices 126a-c, 128a-c, 130a-c and 132a-c, the control device area 104 is provided with the plurality of I/O cards 140a-d. In the illustrated example, the I/O cards 140a-b are configured to control I/O communications between the first control device 120 (and/or the workstation 118) and the field devices 126a-c and 128a-c in the first and second process areas 110 and 112, and the I/O cards 140c-d are configured to control I/O communications between the second control device 122 (and/or the workstation 118) and the field devices 130a-c and 132a-c in the third and fourth process areas 114 and 116.

In the illustrated example of FIG. 1, the I/O cards 140a-d reside in the control device area 104. To communicate information from the field devices 126a-c, 128a-c, 130a-c and 132a-c to the workstation 118, the I/O cards 140a-d communicate the information to the control devices 120 and 122 which, in turn, communicate the information to the workstation 118. Similarly, to communicate information from the workstation 118 to the field devices 126a-c, 128a-c, 130a-c and 132a-c, the workstation 118 communicates the information to the control devices 120 and 122, the control devices 120 and 122 communicate the information to the I/O cards 140a-d, and the I/O cards 140a-d communicate the information to the field devices 126a-c, 128a-c, 130a-c and 132a-c. In an alternative example implementation, the I/O cards 140a-d can be communicatively coupled to the LAN 124 internal to the control devices 120 and 122 so that the I/O cards 140a-d can communicate directly with the workstation 118 and/or the control devices 120 and 122.

To provide fault tolerant operations in the event that any of the I/O cards 140a-d fails, the I/O cards 140a-d are configured as redundant I/O cards. That is, if the I/O card 140a fails, the redundant I/O card 142a assumes control and performs the same operations as the I/O card 140a would otherwise perform. Similarly, the redundant I/O card 142b assumes control if the I/O card 140a fails, and so forth.

As shown in the control device area 104, a first security module 150 is directly coupled to the first control device 120, and a second security module 152 is directly coupled to the second control device 122. Additionally, security modules 154, 156 and 158 are directly coupled to respective control devices 126a, 126b and 126c, which are illustrated in this example as field devices. The security modules 150-158 may, for example, be configured as removably pluggable or insertable devices having a charm-like form (e.g., a circuit card having a protective cover or housing and a pluggable electrical connector). In an alternative example implementation, the security modules 150-158 may be communicatively coupled to the control devices 120 and 122 and/or 126a-c via intermediate structure(s) or device(s).

The security modules 150-158 provide substantially all of the security software and electronics used by the process control system 100 to authenticate and commission the control devices 120, 122 and 126a-c and to authorize actions taken by the control devices in response to received requests or commands. More generally, the security modules 150-158 ensure that proper control devices are properly coupled in the process control system 100 and that these devices are used in a proper manner. A more detailed discussion of the example security modules 150-158 and their related operations are provided below.

In the illustrated example, the marshalling cabinets 136a-b, the security modules 150-158, the I/O cards 140a-d and 142a-d, and the control devices 120, 122 and 126a-c facilitate migrating existing process control system installations to a configuration substantially similar to the configuration of the example process control system 100 of FIG. 1. For example, because the security modules 150-158 can be configured to include any suitable interface type, the security modules 150-158 can be configured to be communicatively coupled to any type of control device. Similarly, the control devices 120 and 122 can be configured to include a known LAN interface to communicate via a LAN to an already installed workstation. In some example implementations, the I/O cards 140a-d and 142a-d can be installed in or communicatively coupled to known control devices so that control devices already installed in a process control system need not be replaced.

Figure 5:
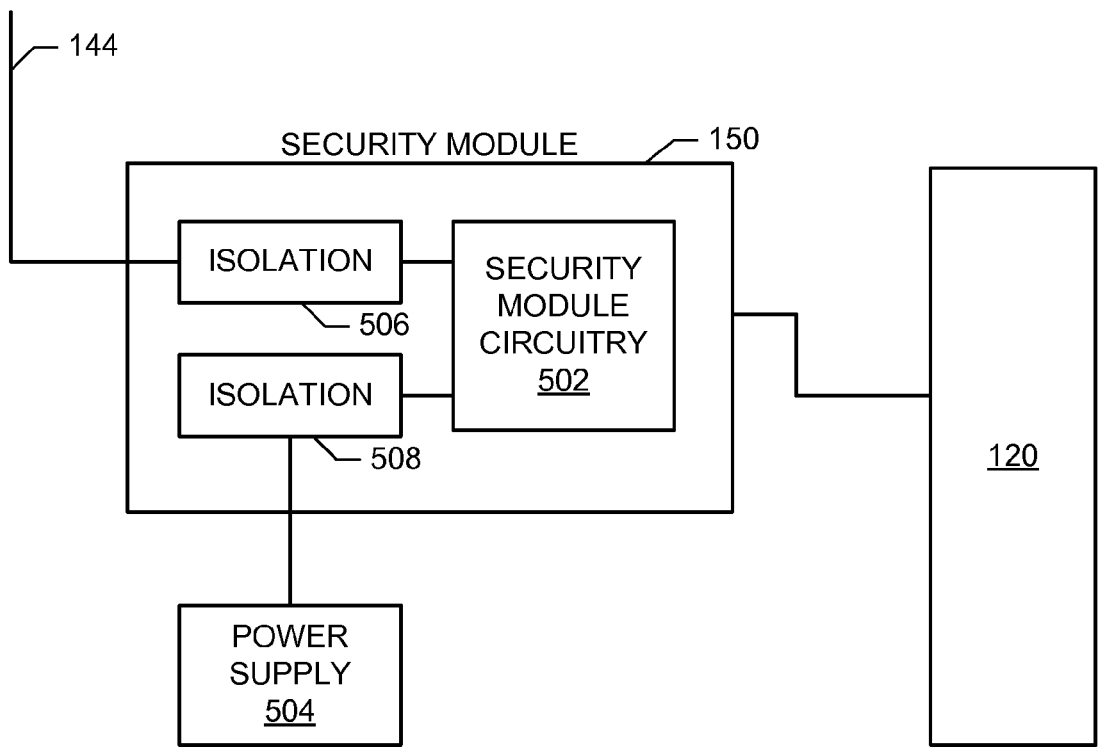
FIG. 5 depicts an isolation circuit configuration that may be implemented in connection with the example security module of FIG. 1 to electrically isolate the security module from control devices and from communication buses.

In an alternative example depicted in FIG. 5, the security modules 150 and 152 may be used to couple the respective control device 120 and 122 to the LAN 124 or internal I/O bus 144. In that example, all communications from the work station 118 are processed by the security modules 150 and 152 and, where proper as detailed below, communicated to the respective control device 120 and 122. In addition, all communications from the I/O cards 140a-d and 142a-d are also processed by the security modules 150 and 152 and, where proper, communicated to the respective control device 150 and 152.

Figure 2:
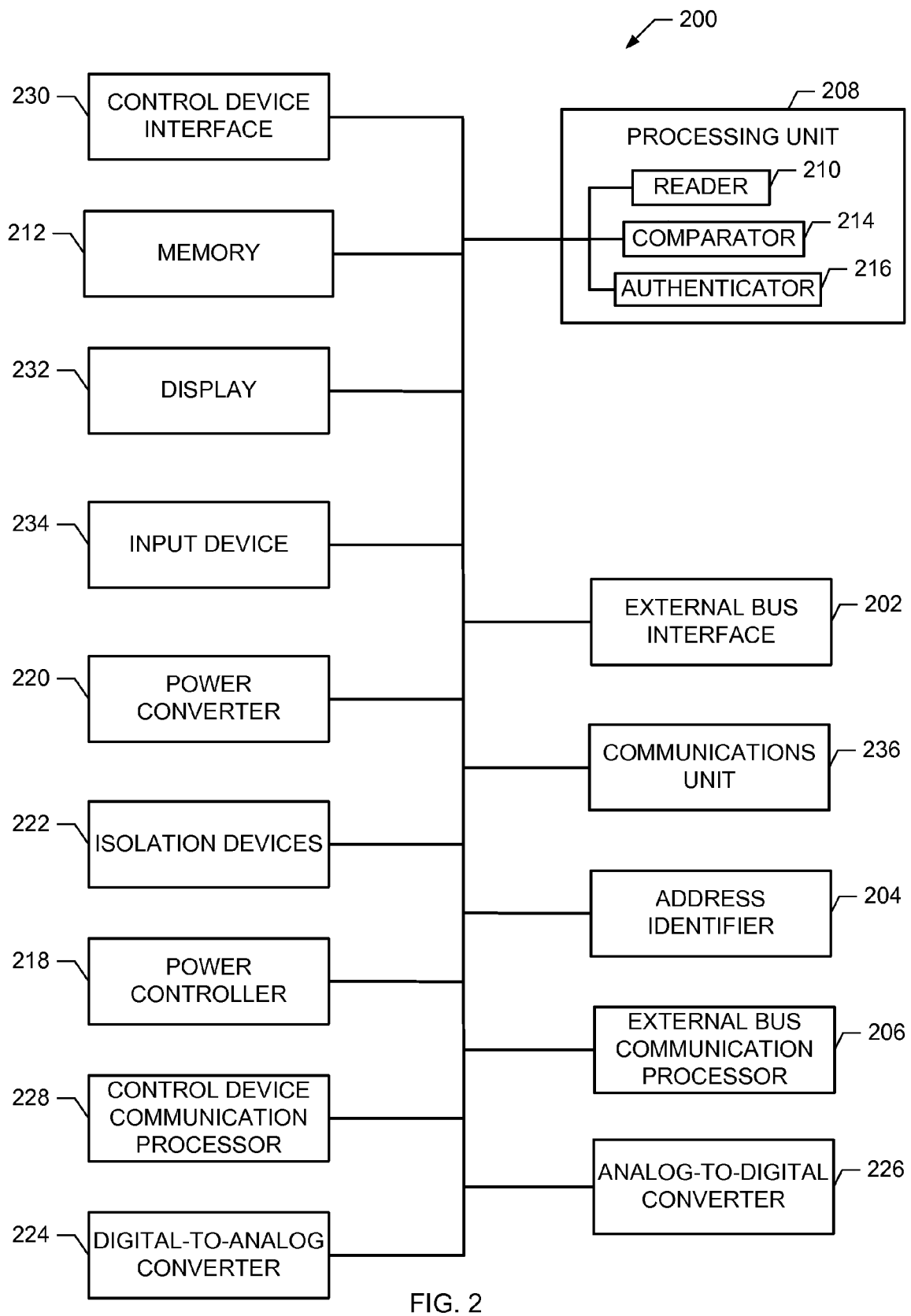
FIG. 2 is a detailed block diagram of the example security module of FIG. 1.

FIG. 2 shows an example implementation of a security module 200, which may represent any of the example security modules described herein. The example security module 200 of FIG. 2 includes an external bus interface 202 to enable the security module 200 to communicate with, for example, an I/O card and/or a workstation in the configuration in which the security module 200 is used to couple a control device to the LAN 124 and/or internal I/O bus.

To identify an address of the security module 200 and/or an address of a control device, the security module 200 is provided with an address identifier 204. The address identifier 204 may be configured to query a control device for a security module address (e.g., a network address) when the security module 200 is plugged into the control device. In this manner, the security module 200 can use the security module address as a source and/or destination address when communicating information to or from the control device.

The example security module 200 is also provided with an external bus communications processor 206 to exchange information with other system components via an external bus. In the illustrated example, the external bus communications processor 206 packetizes information for transmission to another system component and depacketizes information received from other system components. The packetized information is communicated to the external bus interface 202 for transmission over an external bus. In the illustrated example, the external bus communication processor 206 generates header information for each packet to be transmitted and reads header information from received packets. Example header information includes a destination address (e.g., a network address of an I/O card), a source address (e.g., the network address of the security module 200), a packet type or data type (e.g., analog field device information, field device information, command information, temperature information, real-time data values, etc.), and error checking information (e.g., cyclical-redundancy-check (CRC) information). In some example implementations, the external bus communication processor 206 may be implemented using the same microprocessor or microcontroller as a processing unit 208.

To control the various operations of the security module 200, the security module 200 is provided with the processing unit 208. In an example implementation, the processing unit 208 can be implemented using a microprocessor or a microcontroller, as noted above. The processing unit 208 communicates instructions or commands to other portions of the security module 200 to control the operations of those portions.

The processing unit 208 is provided with, or communicatively coupled to a reader 210, which is used to obtain control device information from the control device including, for example, authentication information such as a secret stored in the control device. The reader 210 also obtains information from a memory 212 of the security module 200. The memory may include any type of configurable database and may include information such as, for example, shared secret information for authentication of a control device, encryption information including encryption keys used to authorize actions of the control device, commissioning information associated with the control device, configuration information such as, for example, a device identifier or a control parameter, and any other information.

The processing unit 208 is also provided with, or communicatively coupled to a comparator 214. The comparator 214 may be used to evaluate received and/or stored information. For example, the comparator 214 may compare the information including a first secret received from a control device to which the security module 200 is coupled against a second secret stored in the memory 212. The comparator 214 may evaluate the extent of correlation between the first and second secrets to determine if they constitute a shared secret (e.g., substantially matching or identical secret information). The comparator 214 may further compare information in a request or command or any other communications with an encryption key stored in the memory 212 and evaluate the extent of correlation between the two to determine if the communications are authorized.

The processing unit 208 is also provided with, or communicatively coupled to an authenticator 216. Although represented as separate blocks, in some examples, the authenticator 216 and the comparator 214 may be integrated using software and/or other structure. In this example, the authenticator 216 commissions the control device when the comparator 214 determines that the information from the control device sufficiently correlates to the secret (e.g., a shared secret) stored in the security module 200.

To control the amount of power provided to a control device to which the security module 200 is coupled, the security module 200 is provided with a power controller 218. In the illustrated example, a power supply (e.g., a power supply 504 of FIG. 5), which may be for example, in one of the marshalling cabinets 136a-b or associated with a control device, provides electrical power to the security module 200 to power a communication channel interface to enable communications with the control device. In the illustrated example, the power controller 218 is configured to condition, regulate, and step up and/or step down the electrical power provided to the security module 200 by an external power supply. In some example implementations, the power controller 218 is configured to limit the amount of electrical power used to communicate with control devices and/or delivered to the control devices to substantially reduce or eliminate the risk of sparking in flammable or combustible environments.

To convert electrical power received from a power supply to electrical power for the security module 200, the security module 200 is provided with a power converter 220. In the illustrated example, the circuitry used to implement the security module 200 uses one or more voltage levels (e.g., 3.3 V) that are different from the voltage levels required by the control device to which the security module 200 is coupled. The power converter 220 is configured to provide the different voltage levels for the security module 200 to communicate with the control device using the power received from the power supply. In the illustrated example, the electrical power outputs generated by the power converter 220 are used to power the security module 200 and the control device coupled thereto and to communicate information between the security module 200 and the control device. Some control device communication protocols require relatively higher or lower voltage levels and/or electrical current levels than other communication protocols. In the illustrated example, the power controller 218 controls the power converter 220 to provide the voltage level(s) to power the control device and to communicate with the control device.

To electrically isolate the circuitry of the security module 200 from the control device and/or any other component of the system to which the security module 200 is coupled, the security module 200 is provided with one or more isolation device(s) 222. The isolation device(s) 222 may be implemented using galvanic isolators and/or optical isolators. An example isolation configuration is described in detail below in connection with FIG. 5.

To convert between analog and digital signals, the security module 200 is provided with a digital-to-analog converter 224 and an analog-to-digital converter 226. The digital-to-analog converter 224 is configured to convert digitally represented values (e.g., measurement values) or information received to analog values or information for further communication in a system (e.g., the process control system 100 of FIG. 1). Likewise, the analog-to-digital converter 226 is configured to convert analog values or information received to digitally represented values or information for further communication in a system (e.g., the process control system 100 of FIG. 1). In an alternative example implementation in which the communication in the system is entirely digital and/or entirely analog, the digital-to-analog converter 224 and/or the analog-to-digital converter 226 may be omitted from the security module 200.

To control communications with a control device to which the security module 200 is coupled, the security module 200 is provided with a control device communication processor 228. The control device communication processor 228 ensures that information is in the correct format and voltage type (e.g., analog or digital) to be communicated to the control device to which the security module 200 is coupled. The control device communication processor 228 is also configured to packetize or depacketize information if the control device to which the security module 200 is coupled is configured to communicate using digital, packetized information. In addition, the control device communication processor 228 is configured to extract information received from a control device and communicate that information to the analog-to-digital converter 226 and/or to the external bus communication processor 206 for subsequent communication to another system component.

The example security module 200 is also provided with a control device interface 230 configured to communicatively couple the security module 200 to the control device to which it is physically coupled. For example, the information packetized by the control device communication processor 228 is communicated to the control device interface 230 for transmission over an internal bus in the control device to which the security module 200 is coupled.

In the illustrated example, the control device communication processor 228 may also be configured to timestamp information received. Generating timestamps at the security module 200 facilitates implementing sequence of events (SOE) operations using timestamp accuracies in the sub-millisecond range. For example, the timestamps and respective information can be communicated to the workstation 118. Sequence of events operations performed by, for example, the workstation 118 (FIG. 1) (or any other processor system) can then be used to analyze what happened before, during, and/or after a particular state of operation (e.g., a failure mode) to determine what caused the particular state of operation to occur. Time stamping in the sub-millisecond range also enables capturing events using relatively higher granularity. In some example implementations, the control device communication processor 228 and the processing unit 208 can be implemented using the same microprocessor or microcontroller.

To display secrets, codes, instructions, identification, status or other information in association with the control device or the security module 200, the security module 200 is provided with a display 232. If the authenticator 216 does not commission a control device, the display 232 may provide information indicative of a failed commissioning attempt. If the security module 200 requires a two-person authorization, the display 232 may provide information (including, e.g., authorization information received from a control device and/or the security module 200, instructions, etc.) to one of the persons involved in the authorization. In addition, the display 232 can be used to display control device activity information (e.g., operation and maintenance information etc.), data type information (e.g., analog signal, digital signal, etc.), and/or any other control device information. If the security module 200 is configured to be communicatively coupled to a plurality of control devices, the display 232 can be used to display control device information associated with all of the control devices communicatively coupled to the security module 200. In the illustrated example, the display 232 is implemented using liquid crystal displays (LCDs). However, in other example implementations, the display 232 can be implemented using any other suitable type of display device.

The security module 200 is also provided with an input device 234. The input device 234 may be used by an operator to enter information into the security module 200, for example in response to the presentation of at least some of the authorization or other information via the display 232. For example, during two-person authorization, as detailed below, an operator at the control device may enter a code or command into the security module 200 in response to a secret that is shown in the display 232 and which was generated from a request or a command sent to the control device. The input device 234 may include a key pad, a touch screen, a touch panel, a button, a switch or any other suitable device that may be used to register an action by a person.

Also, in the configuration in which the security module 200 also includes the communication software and electronics for the control device, the security module 200 is provided with a communications unit 236. An example communications unit 236 is described in U.S. application Ser. No. 12/236,165.

Figure 3:
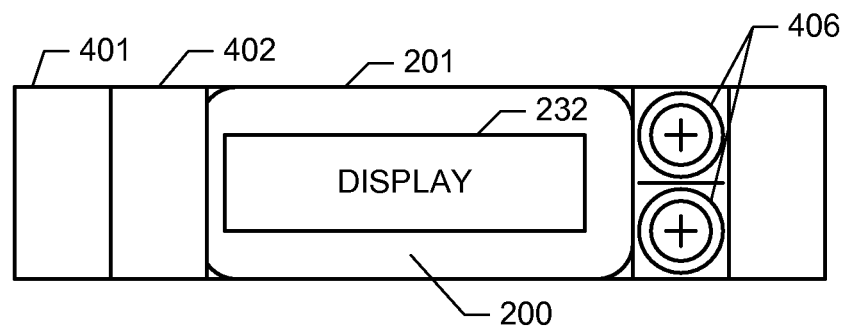
FIG. 3 depicts a top view and FIG. 4 depicts a side view of the example security module of FIG. 1.
Figure 4:
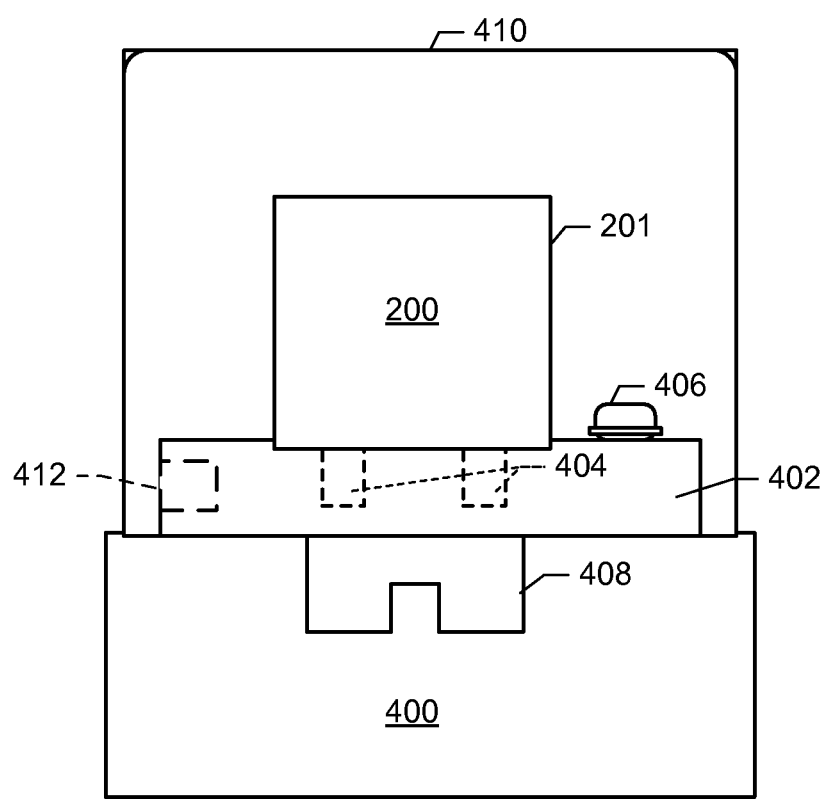

FIG. 3 depicts a top view and FIG. 4 a side view of an example mechanical connection of the example security module 200 and an example control device 400, which may represent any of the example security modules and/or control devices described herein. In the illustrated example, the example security module 200 includes a body 201 and one or more contacts 404 (e.g., pins, tabs, traces, etc.) that communicatively couple and/or electrically couple the security module 200 to the control device 400. In this example, the security module 200 is coupled to the control device 400 via an intervening base 402. The base 402 is provided with fasteners 406 (e.g., screws), which may be, for example, a device interface, to tie down, terminate or secure conductive communication media (e.g., wire ends) from an I/O bus. When the security module 200 is removably coupled to the base 402, the fasteners 406 are communicatively coupled to one or more of the contacts 404 to enable conveying of signals and communicating information between the security module 200 and the control device 400. In other example implementations, the base 402 may be provided with any other suitable type of field device interface (e.g., a socket) instead of fasteners 406.

To communicatively couple the security module 200 to the control device 400, the base 402 is provided with a control device contact or connector 408. When a user plugs the base 402 into the control device 400, the control device connector 408 engages an internal bus of the control device 400. The control device connector 408 may be implemented using any suitable interface including an interface such as, for example, a punch block. To enable communicating information between the security module 200 and the control device 400, the control device connector 408 is connected to one or more of the contacts 404 of the security module 200.

In the illustrated example, the security module 200 also includes a cover 410 (removed in FIG. 3), which may be used to shield the security module 200 and/or the connection of the security module 200 and the control device 400 from the surrounding environment. The cover 410 prevents moisture and/or other adverse or otherwise potentially damaging environmental conditions from having a harmful effect on the security module 200 in process areas that may experience those conditions. The cover 410 may be made of any suitable plastic, metal or other material suitable to seal or otherwise protect the communication module 400.

As shown in FIG. 4, the base 402 may also be provided with an optional display interface connector 412 to communicatively couple the security module 200 to an external display. For example, if the security module 200 is implemented without the display 232, the security module 200 can use the display interface connector 412 to output instructions, warnings, errors, codes, values or any other information to an external display.

FIG. 5 depicts an isolation circuit configuration that may be implemented in connection with the example security module 150 of FIG. 1 to electrically isolate the security module 150 from the control device 120 and, for example, the LAN 124 and/or an internal I/O bus 144. In this example the security module 150 is illustrated, however, any other security module may be coupled to any other control device in the same or a similar manner. In the illustrated example, the security module 150 includes security module circuitry 502 (e.g., one or more of the blocks described above in connection with FIG. 2). Also, the security module 150 is connected to the internal I/O bus 144 and a power supply 504.

To electrically isolate the security module circuitry 502 from the internal I/O bus 144, the security module 150 is provided with an isolation circuit 506. In this manner, the security module circuitry 502 can be configured to follow (e.g., float) the voltage level of the control device 120 if power surges or other power variations occur in the control device 120 without affecting the voltage of the internal I/O bus 144 and without causing damage to the I/O card 140a (FIG. 1). The isolation circuit 506 and any other isolation circuits implemented in the security module 150 may be implemented using optical isolation circuits or galvanic isolation circuits.

To isolate the security module circuitry 502 from the power supply 504, the security module 150 is provided with an isolation circuit 508. By isolating the security module circuitry 502 from the power supply 504, any power variation (e.g., power surges, current spikes, etc.) associated with the control device 120 will not damage the power supply 504. Also, any power variations in the security module 150 will not damage or adversely affect the operation of the other system components including, for example, the other security modules 152.

Typically, isolation circuits are provided in the control devices, thereby reducing the amount of space available for security systems. However, providing the isolation circuits 506 and 508 in the security module 150 as shown in the illustrated example of FIG. enables selectively using isolation circuits only with security modules that require isolation. For example, some of the security modules 150-158 FIG. 1 may be implemented without isolation circuits.

Figure 6:
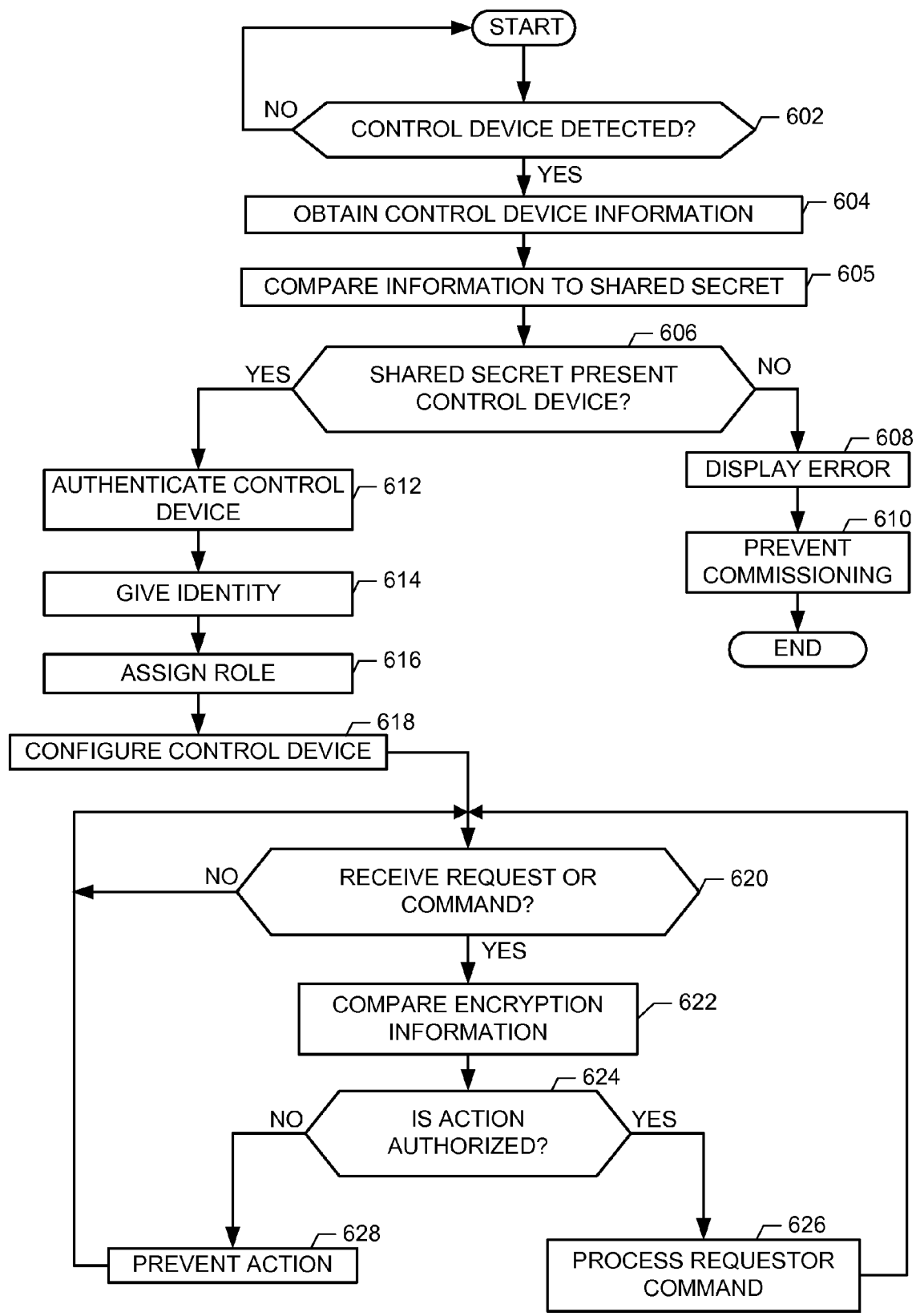
FIG. 6 depicts a flowchart of an example method that may be used to implement the example security module of FIG. 1 to commission a control device and authorize an action.
Figure 7:
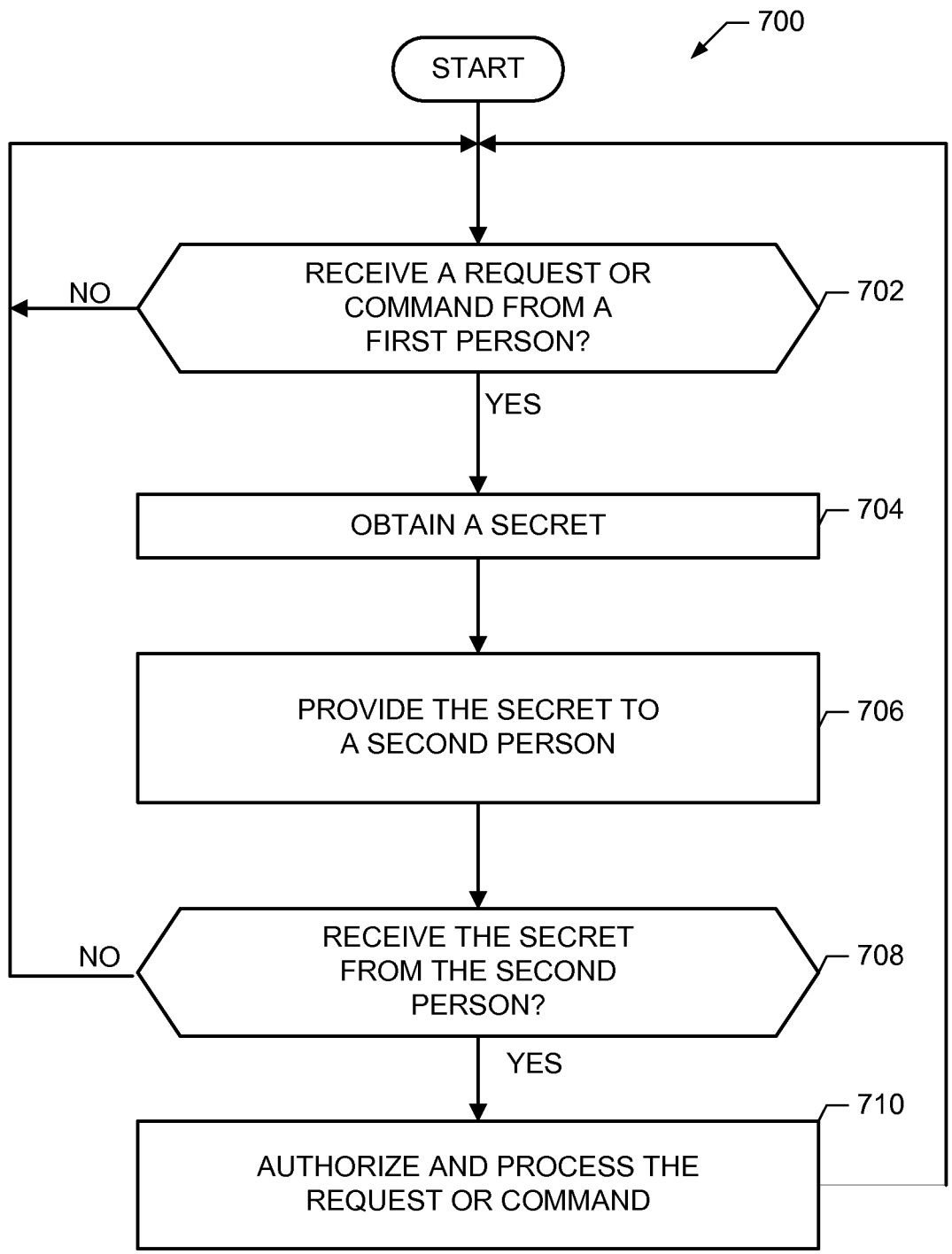
FIG. 7 depicts a flowchart of an example method that may be used to implement the example security module of FIG. 1 to implement two-person authorization of an action.

FIGS. 6 and 7 are flowcharts of example methods that may be used to implement security modules (e.g., the security modules 150-158 and 200 of FIGS. 1 and 2). In some example implementations, the example methods of FIGS. 6 and 7 may be implemented using machine readable instructions comprising a program for execution by a processor (e.g., the processor 812 shown in an example processor system 810 of FIG. 8). The program may be embodied in software stored on a tangible computer or processor readable medium such as a CD-ROM, a floppy disk, a hard drive, a digital versatile disk (DVD), or a memory associated with a processor and/or embodied in firmware and/or dedicated hardware in a well-known manner. Further, although the example methods are described with reference to the flowcharts illustrated in FIGS. 6 and 7, persons of ordinary skill in the art will readily appreciate that many other methods of implementing the example security modules 150-158 and 200, described herein may alternatively be used. For example, the order of execution of the blocks may be changed, and/or some of the blocks described may be changed, eliminated, or combined.

The example methods of FIGS. 6 and 7 are described in connection with the example security module 150 of FIG. 1. Specifically, the flowcharts of FIGS. 6 and 7 are used to describe how the example security module 150 authenticates control devices 120 and authorize actions related thereto. However, the example methods of FIGS. 6 and 7 may be more generally used to implement any other security module(s) (e.g., the modules 152-158, 200, etc.).

Turning in detail to FIG. 6, initially the security module 150 is coupled to the control device 120, and the security module 150 determines whether it has detected the control device 120 (block 602). For example, the security module 150 detects the control device 120 if the security module 150 makes an electrical connection, receives an interrupt or a status register or otherwise senses the control device 120. If the control device 120 is not detected, control remains at block 602 until the control device 120 (or any other control device) is detected.

Once the control device 120 has been detected, the security module 150 obtains control device information (block 604). For example, the reader 210 retrieves information stored on the control device. Such information may include, for example, a serial number, indication of make and/or model and any other information that may be relevant to determining the type of control device and potential uses. In particular, the control device information may include a shared secret or a portion of a shared secret.

The security module 150 then compares the information obtained at block 604 (any obtained secret information) to the secret stored in the security module 150 (block 605). After making the comparison at block 605, the security module 150 determines if the obtained control device information includes a shared secret (block 606) (i.e., the secret stored in the security module 150 substantially or identically matches any secret information obtained from the control device 120). For example, the comparator 214 analyzes the control device information and evaluates if any of that information matches or otherwise correlates to other information including, for example, a shared secret stored in the memory 212 of the security module 150. If a correlation is not found, the security module 150 may display an error message (block 608). The lack of correlation between the control device information and the shared secret may be indicative of an incorrect control device in that position of the process control system 100. Additionally or alternatively, the lack of correlation may be indicative of an incorrect security module for that particular control device. For example, the control device may require a security module with different or more restrictive security features. A security module intended for a less security sensitive control device would not properly protect and secure the system in this example. When it has been determined that there is a lack of correlation between the control device information and the secret stored in the security module 150, commissioning of the control device is prevented (block 610) and the process ends. In this situation, the control device 120 remains inoperable.

If it is determined that there is a correlation between the control device information and the shared secret (block 606), the security module 150 proceeds to authenticate the control device (block 612). The authentication is an indication that the control device 120 is the proper device for this position in the process control system and/or that the security module 150 is the proper security module (e.g., contains the proper security features) for the control device 120. To provide the authentication indication, the authenticator 216 of the processing unit 208 may, for example, generate a signal indicating that the control device 120 is authenticated and/or the authenticator 216 may release communication and/or electrical limits or stops to enable the control device 120 to operate. Thus, with the authentication, a secure communications state is established for the control device 120. In addition, the authenticator 216 may provide the control device 120 with an identity (block 614) such as, for example, an alphanumeric string of characters used to identify the control device 120 in the system for, for example, the purpose of addressing communications within the control system 100. The authenticator 216 also assigns a role to the control device 120 (block 616). The role may provide an indication of the actions the control device 120 may take in the system, which may include, for example, the field devices with which the control device 120 may communicate, monitor and/or control, the commands the control device 120 can give and other actions the control device 120 can take. In addition, the authenticator 216 may facilitate configuration of the control device 120 (block 618). Configuration of the control device 120 includes providing to or providing access to data or any other information or tools and/or control parameters the control device 120 needs to perform its role in the system.

After the control device 120 has been commissioned (e.g., blocks 612-618), the control device 120 receives requests and commands during the operation of the system 100. The security module 150 monitors the communications of the control device 120 and determines if a request or command is received at the control device 120 (block 620). If no request or command is received at the control device, control remains at block 620. If a request or command is received, the security module 150 determines if the control device 120 would be used properly in responding to the request or command. To determine if the control device 120 is authorized to take an action in response to the request or command, the security module 150 compares any encryption information in the requests or commands (block 622) with one or more encryption keys stored in the memory 212. If the encryption keys of the security module 150 indicate that an action is authorized (block 624), then the security module 150 enables the control device 120 to process the request or command (block 626) and controls return to block 620 for subsequent communication(s).

Additionally or alternatively, the encryption based authorization may be replaced with or substituted with other approval techniques including verification, key management and anti-jamming techniques. Furthermore, in some examples, the security modules may maintain a white list of devices allowed to communicate with the control device 120 or of actions the control device 120 can perform. If the security module 150 maintains a white list or other pre-approval list, the process would proceed from receiving a pre-approved request or command from a device and/or receiving a communication from a pre-approved device (block 620) to authorizing and processing the request or command in the communication(s) (block 626) without the comparison and other actions executed in the intervening operations of FIG. 6.

However, if it is determined that an action is not authorized (block 624), the security module 150 protects the control device 120 (and the entire system 100) against unauthorized action by, for example, preventing the control device 120 from taking action (block 628) in response to the communication including the request or command. Control then returns to block 620 for the next communication.

FIG. 7 depicts a flowchart of an example method that may be used to implement the security modules of FIGS. 1 and 2 to implement two-person authorization of an action (e.g., a control action by a control device). In process control systems, some operations are sufficiently security sensitive that they require, for example, an operator or engineer in the control room and another person at the device, i.e., two-person authorization of the action of the control device 120 is required to perform.

The example method begins with a determination of whether a request or command associated with a first person (e.g., a person in the control room 102) has been received at the control device 120 (block 702). If no such communication containing a request or command is received, control remains at block 702 until such a communication is received. However, if such a request or command has been received, the security module 150 or other security components that may be immovably coupled to (e.g., integrated within) the control device, obtains a secret associated with the request or command sent by a first person (block 704). In some examples, the secret to be obtained is generated by the security module 150 or other security components that may be immovably coupled to (e.g., integrated within) the control device. The secret may be any type of word, code, encryption, pulse, light pattern, sound or any other type of private communication or key.

The secret is then provided to a second person (e.g., a person local to the control device 120) (block 706), who provides authorization (if appropriate) for an action in response to the received request or command. In some examples, the secret is displayed on the display 232 for the second person to view. In other examples, the secret may be sent to any other display (e.g., in the workstation 118) or otherwise presented to the second person via the security module 150.

The second person then executes an action including, for example returning the secret to the security module 150, the first person and/or the control device 120. In some examples, the second person enters an action to return the secret via the input device 234 of the security module, which may include typing instructions to forward the secret to the first person. In some examples, the secret is sent from the second person to a source of the request (e.g., the workstation 118 in the control room 102) and then returned to the control device 120. When the secret is returned or it is otherwise determined that the second person executed an action to authorize a control device action (block 708), the security module 150 recognizes that an action is authorized in response to the request or command, and the security module 150 authorizes the control device to process the request or command (block 710). Control then returns to block 702 until another communication is received. If, for example, after a predetermined amount of time, the second person has not returned the secret (block 708), control returns to block 702 until another communication is received. Thus, block 708 may include operations that include a timeout after a pre-determined interval.

Figure 8:
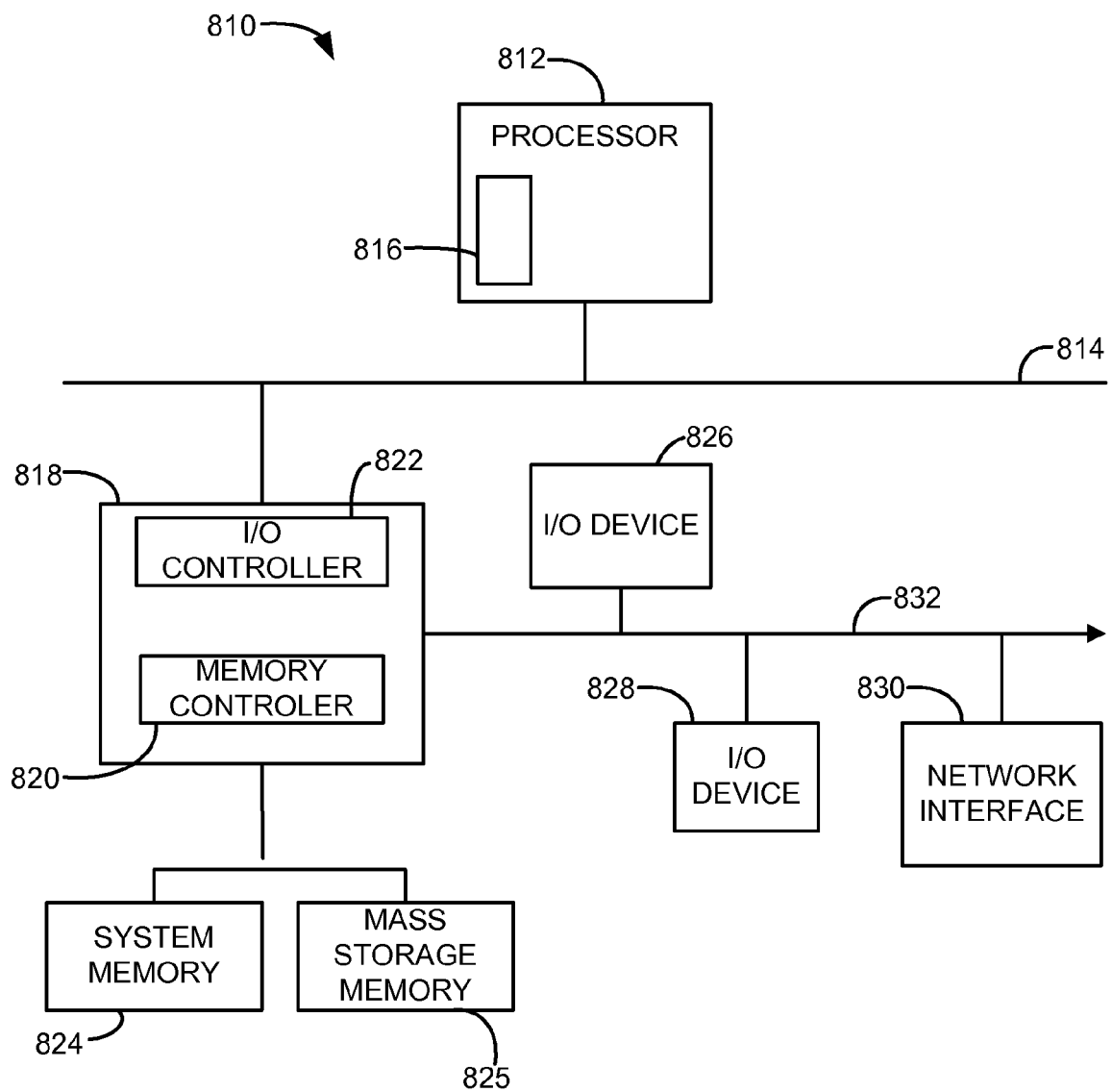
FIG. 8 is a block diagram of an example processor system that may be used to implement the example methods and apparatus described herein.

FIG. 8 is a block diagram of the example processor system 810 that may be used to implement the apparatus and methods described herein. For example, processor systems similar or identical to the example processor system 810 may be used to implement the workstation 118, the control devices 120, 122 and 126a-c, the I/O cards 140a-d and 142a-d, and/or the security modules 150-158 of FIG. 1. Although the example processor system 810 is described below as including a plurality of peripherals, interfaces, chips, memories, etc., one or more of those elements may be omitted from other example processor systems used to implement one or more of the workstation 118, the control devices 120, 122 and 126a-c, the I/O cards 140a-d and 142a-d, and/or the security modules 150-158.

As shown in FIG. 8, the processor system 810 includes the processor 812 that is coupled to an interconnection bus 814. The processor 812 includes a register set or register space 816, which is depicted in FIG. 8 as being entirely on-chip, but which could alternatively be located entirely or partially off-chip and directly coupled to the processor 812 via dedicated electrical connections and/or via the interconnection bus 814. The processor 812 may be any suitable processor, processing unit or microprocessor. Although not shown in FIG. 8, the system 810 may be a multi-processor system and, thus, may include one or more additional processors that are identical or similar to the processor 812 and that are communicatively coupled to the interconnection bus 814.

The processor 812 of FIG. 8 is coupled to a chipset 818, which includes a memory controller 820 and a peripheral input/output (I/O) controller 822. As is well known, a chipset typically provides I/O and memory management functions as well as a plurality of general purpose and/or special purpose registers, timers, etc. that are accessible or used by one or more processors coupled to the chipset 818. The memory controller 820 performs functions that enable the processor 812 (or processors if there are multiple processors) to access a system memory 824 and a mass storage memory 825.

The system memory 824 may include any desired type of volatile and/or non-volatile memory such as, for example, static random access memory (SRAM), dynamic random access memory (DRAM), flash memory, read-only memory (ROM), etc. The mass storage memory 825 may include any desired type of mass storage device. For example, if the example processor system 810 is used to implement the workstation 118 (FIG. 1), the mass storage memory 825 may include a hard disk drive, an optical drive, a tape storage device, etc. Alternatively, if the example processor system 810 is used to implement the control devices 120, 122 and 126a-c, the I/O cards 140a-d and 142a-d, and/or the security modules 150-158, the mass storage memory 825 may include a solid-state memory (e.g., a flash memory, a RAM memory, etc.), a magnetic memory (e.g., a hard drive), or any other memory suitable for mass storage in the control devices 120, 122 and 126a-c, the I/O cards 140a-d and 142a-d, and/or the security modules 150-158.

The peripheral I/O controller 822 performs functions that enable the processor 812 to communicate with peripheral input/output (I/O) devices 826 and 828 and a network interface 830 via a peripheral I/O bus 832. The I/O devices 826 and 828 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The network interface 830 may be, for example, an Ethernet device, an asynchronous transfer mode (ATM) device, an 802.11 device, a DSL modem, a cable modem, a cellular modem, etc. that enables the processor system 810 to communicate with another processor system.

While the memory controller 820 and the I/O controller 822 are depicted in FIG. 8 as separate functional blocks within the chipset 818, the functions performed by these blocks may be integrated within a single semiconductor circuit or may be implemented using two or more separate integrated circuits.

The example methods and systems described herein advantageously enable an operator of a process control system to employ a plurality of security modules that are interchangeably couplable to a plurality of control devices. This enables the operator of the process control system to quickly and easily change the security program of a control device. For example, the operator may want to change the security program of a control device from one set of security functions, level or features to another set of security functions, level or features where the other set of security features has certain performance characteristics or other benefits and protections that would be more advantageous for particular control devices in the process control system. In addition, the operator may wish to update a control device with a revised or upgraded security program or specific feature that was not in existence when the device was originally manufactured.

In addition, an operator of a process control system that includes state-of-the-art pre-release devices and security features that have been incorporated into the system prior to the formal adoption of industry standards will be able to couple one of the example security modules described herein that incorporates the industry standards into one of the pre-release control devices to update the device to meet the proper standards.

Another benefit realized with the example security modules described herein is that the control device coupled to a security module may be changed while all of the security features, commissioning information, etc. remain unchanged. In addition, some examples of the security module may include diagnostics software that may be used to gather information from the control device. An operator may access newer, better, or more device-appropriate diagnostics by changing the security module to another security module having the desired diagnostics software. For example, a new diagnostics test may be developed to better assess a particular condition of a control device. With the example security modules described herein, the new diagnostics test may be implemented on an established control device without changing the control device or the electronic circuit board of the existing control device.

Furthermore, manufacturers of control devices can separate the security electronics and software and/or diagnostics electronics and software from the remaining electronics of the control devices. Thus, fewer varieties of circuit boards for the control devices need to be developed, manufactured, inventoried, etc. For example, if a manufacturer offers five control devices each to be provided with two different security programs, ten circuit boards (one for each device and program combination) will need to be produced. Using the example security modules described herein, only five circuit boards (one for each device) and two types of security modules (one type for each program) will need to be produce, thus greatly reducing the development and storage costs of the manufacturer. In addition, the security modules can be used with other control devices.

Still further, the isolation circuitry described above with respect to FIG. 5 protects the power supply and control devices coupled to the example security modules. In the event of an electrical spike or inadvertent wiring by an electrician to an unacceptably high voltage or current load, the isolation circuit causes the security module to absorb the excessive load. Therefore, only the security module may need replacement and the circuit board of the control device would remain functional which, as noted above, greatly decreases the costs of maintenance and repairs.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A removable security module for use with a first process control device and a second process control device, comprising:
   a body to be removably coupled to the first process control device or the second process control device;
   a memory disposed in the body, the memory to store a first secret; and
   a processing unit disposed in the body and coupled to the memory, the processing unit to:
   read authentication information from the first process control device;
   perform a comparison to compare the authentication information to the first secret;
   authenticate the first process control device based on the comparison;
   determine whether a request or command associated with a first operator has been received;
   generate and provide a second secret to a second operator;
   receive an action from the second operator to return the second secret to the first operator or to the security module;
   authorize the first control device to process the request or command when the second secret is returned; and
   enable the second process control device to operate after being coupled to the module after the module is removed from the first process control device without authenticating the second process control device.

2. The removable security module of claim 1, wherein the processing unit is to prevent commissioning of the first process control device if the first process control device is not authenticated based on the comparison.

3. The removable security module of claim 1, wherein the comparison is a first comparison and the memory includes encryption information stored thereon, and wherein the processing unit is to:
   extract communication information from a communication;
   perform a second comparison to compare the communication information to the encryption information; and
   enable the first process control device to process the communication based on the second comparison.

4. The removable security module of claim 3, wherein the encryption information comprises an encryption key.

5. The removable security module of claim 1, wherein the memory is to store commissioning information associated with the first process control device.

6. The removable security module of claim 5, wherein the commissioning information comprises configuration information.

7. The removable security module of claim 6, wherein the configuration information comprises at least one of a process control device identifier or a control parameter.

8. The removable security module of claim 1, further comprising a display to present authorization information received from the first process control device.

9. The removable security device of claim 8, further comprising an input device to receive a user input in response to the presentation of at least some of the authorization information via the display.

10. The removable security device of claim 8, wherein the authorization information is a secret stored in the first process control device.

11. The removable security module of claim 1, further comprising a communications unit to packetize information for transmission to a third process control device.

12. The removable security module of claim 1, wherein, the comparison is a first comparison, the memory includes a list of approved process control devices, the list of approved process control devices generated prior to removably coupling the body to the first process control device, and
   the processing unit to:
   identify a communication to the authenticated first process control device from a third process control device having an identifier;
   perform a second comparison to compare the identifier to the list of approved process control devices; and
   authorize the first process control device to process the communication from the third process control device based on the second comparison.

13. A plurality of removable security modules for use with a process control device in a process system, wherein each of the modules comprises:
   a body to be removably coupled to the process control device;
   a memory disposed in the body, the memory to store a first secret; and
   a processing unit disposed in the body and coupled to the memory, the processing unit to:
   read authentication information from the process control device;
   perform a comparison to compare the authentication information to the first secret;
   authenticate the process control device based on the comparison;
   determine whether a communication associated with a first operator has been received;
   generate and provide a second secret to a second operator;
   receive an action from the second operator to return the second secret to the first operator or to the security module;
   authorize the process control device to process the communication when the second secret is returned; and change an authorization setting for other devices to communicate with the process control device without modifying the software of the process control device, wherein the authorization setting is to prevent the process control device from processing an unauthorized communication.

14. The plurality of removable security modules of claim 13, wherein a first module is to assign the process control device a first role in the process system and a second module is to assign the process control device a second role in the process system, wherein the first role and the second role in the process system enable a different type of function or level of functionality to be provided by the process control device.

15. The plurality of removable security modules of claim 13, wherein at least one of the modules is to provide upgraded functionality relative to another one of the modules.

16. The plurality of removable security modules of claim 13, wherein a first module of the plurality of modules is effective as a replacement of a second module of the plurality of modules.

17. The plurality of removable security modules of claim 16, wherein the process control device remains in service when the first module replaces the second module.

18. The plurality of removable security modules of claim 13, wherein a module of the plurality of modules is couplable to a second process control device.

19. The plurality of removable security modules of claim 18, wherein the second process control device is to operate after being coupled to the module without commissioning the second process control device to operate.

20. A method of securing a process control device with a removable security module, the method comprising:
reading authentication information in the process control device via a first security module;
performing a comparison to compare the authentication information to a first secret stored in a memory of the first security module;
authenticating the process control device and providing a first security measure to the process control device based on the comparison via the first security module;
determining whether a communication associated with a first operator has been received;
generating and providing a second secret to a second operator;
receiving an action from the second operator to return the second secret to the first operator or to the first security module;
authorizing the process control device to process the communication when the second secret is returned;
removing the first security module; and
providing a second security measure to the process control device via a second security module coupled to the process control device without re-authenticating the process control device.

21. The method of claim 20, further comprising preventing commissioning of the process control device if the process control device is not authenticated based on the comparison.

22. The method of claim 20, further comprising using encryption information stored in the memory to secure communications associated with the process control device.

23. The method of claim 22, wherein the encryption information comprises an encryption key.

24. The method of claim 20, further comprising storing commissioning information in the memory in response to the process control device being authenticated.

25. The method of claim 24, wherein the commissioning information comprises at least one of a device identifier or a control parameter.

26. The plurality of removable security modules of claim 13, wherein the comparison is a first comparison, the memory includes an encryption key, and the processing unit is to:
monitor communications to the authenticated process control device for a request with a key;
perform a second comparison to compare the key to the encryption key; and
authorize the authenticated process control device to process the request based on the first comparison and the second comparison.

27. A distributed process control system comprising:
a plurality of process control devices, wherein each of the process control devices includes software;
a first removable security module having a first processor to:
read authentication information from at least one of the process control devices;
perform a comparison to compare the authentication information to a first secret;
authenticate the at least one of the process control devices based on the comparison;
authorize one or more applications for use with the at least one of the process control devices; and
prevent first unauthorized communications to the at least one of the process control devices with a first security measure; and
a second removable security module having a second processor to prevent second unauthorized communications to the at least one of the process control devices with a second security measure without the second processor reconfiguring the software of the at least one of the process control devices, wherein the first processor or the second processor is to determine whether a two-person authorization of one or more applications is needed, wherein at least one of the first processor or the second processor performs the two-person authorization by:
determining whether a communication associated with a first person has been received;
generating and providing a second secret to a second person;
receiving an action from the second person to return the second secret to the first person or to the corresponding removable security module; and
authorizing the at least one of the process control devices to process the communication when the second secret is returned.

28. A distributed process control system as defined in claim 27, wherein in response to completing a predetermined interval, the first processor or the second processor is to timeout.

29. A distributed process control system as defined in claim 27, wherein the first processor or the second processor is to execute the one or more applications when the second secret is returned to the first processor or the second processor.

30. The method as described in claim 20, wherein the comparison is a first comparison, the method further comprising:
monitoring communications to the authenticated process control device for a request;
performing a second comparison to compare request information included in the request to encryption information stored in the memory of the first security module; and authorizing the process control device to process the request based on the second comparison.

\* \* \* \* \*